US012645966B2

(12) United States Patent
Montanaro et al.

(10) Patent No.: US 12,645,966 B2
(45) Date of Patent: Jun. 2, 2026

(54) MITIGATING ERRORS IN ALGORITHMS PERFORMED USING QUANTUM INFORMATION PROCESSORS

(71) Applicant: Phasecraft Limited, London (GB)

(72) Inventors: Ashley Montanaro, London (GB);
Stasja Stanisic, London (GB)

(73) Assignee: Phasecraft Limited, London (GB)

( * ) Notice: Subject to any disclaimer, the term of this patent is extended or adjusted under 35 U.S.C. 154(b) by 1052 days.

(21) Appl. No.: 17/586,260

(22) Filed: Jan. 27, 2022

(65) Prior Publication Data

US 2022/0245500 A1     Aug. 4, 2022

(30) Foreign Application Priority Data

Jan. 29, 2021     (GB) ..................................... 2101242

(51) Int. Cl.
*G06N 10/40*          (2022.01)
(52) U.S. Cl.
CPC .................................... *G06N 10/40* (2022.01)
(58) Field of Classification Search
CPC ........ G06N 10/00; G06N 10/20; G06N 10/40;
G06N 10/60; G06N 10/70; G06N 20/00
See application file for complete search history.

(56) References Cited

U.S. PATENT DOCUMENTS 11,966,707  B2 *    4/2024   Cao ......................... G06F 40/40
2020/0394549  A1 *  12/2020   Dallaire-Demers ...  G06N 10/80
2022/0254453  A1 *    8/2022   Babbush ................ G06N 10/60
2022/0414519  A1 *  12/2022   McClean ............... G06N 10/20
2023/0104058  A1 *    4/2023   Hopfmueller .......... G06N 10/60
714/10

OTHER PUBLICATIONS

Czarnik et el., "Error mitigation with Clifford quantum-circuit data", arxiv.org, Cornell University Library, 201 OLIN Library Cornell University Ithaca, NY 14853, May 20, 2020 (Year: 2020).*

(Continued)

*Primary Examiner* — Albert Decady
*Assistant Examiner* — Enamul M Kabir
(74) *Attorney, Agent, or Firm* — Kilpatrick Townsend & Stockton LLP

(57)                 ABSTRACT

A method comprises, for each of a plurality of FLO circuits, (i) executing, one or more times using the quantum information processor, that FLO circuit to determine a first value of an observable; and (ii) classically simulating that FLO circuit to determine a second value of the observable. A training set comprises tuples, each tuple comprising parameter(s) for defining a FLO circuit, the corresponding first value of the observable determined for that FLO circuit, and the corresponding second value of the observable determined for that FLO circuit. The training set is used to determine a noise inversion function. The quantum information processor executes one or more times a quantum circuit for implementing at least a part of the algorithm to determine a noisy value of an observable. The noise inversion function is applied to the noisy value and a corrected value of the observable is determined.

15 Claims, 11 Drawing Sheets

600

(56)         References Cited

OTHER PUBLICATIONS

Bravyi et al., "Classical simulation of dissipative fermionic linear optics", arxiv.org, Cornell University Library, 201 OLIN Library Cornell University Ithaca, NY 14853, Dec. 9, 2011 (Year: 2011).*

Bausch, et al., "Mitigating Errors in Local Fermionic Encodings", Cornell University Library, 2020, 21 pages.

Bravyi, et al., "Classical Simulation of Dissipative Fermionic Linear Optics", Cornell University Library, XP080554311, 2011, 19 pages.

Czarnik, et al., "Error Mitigation with Clifford Quantum-Circuit Data", Cornell University Library, XP081675788, 2020, 11 pages.

GB2101242.2, Combined Search and Examination Report, Nov. 3, 2021, 10 pages.

Montanaro, et al., "Error Mitigation by Training with Fermionic Linear Optics", Cornell University Library, 2021, 11 pages.

Sopena, et al., "Simulating Quench Dynamics on a Digital Quantum Computer with Data-Driven Error Mitigation", Cornell University Library, 2021, 16 pages.

* cited by examiner

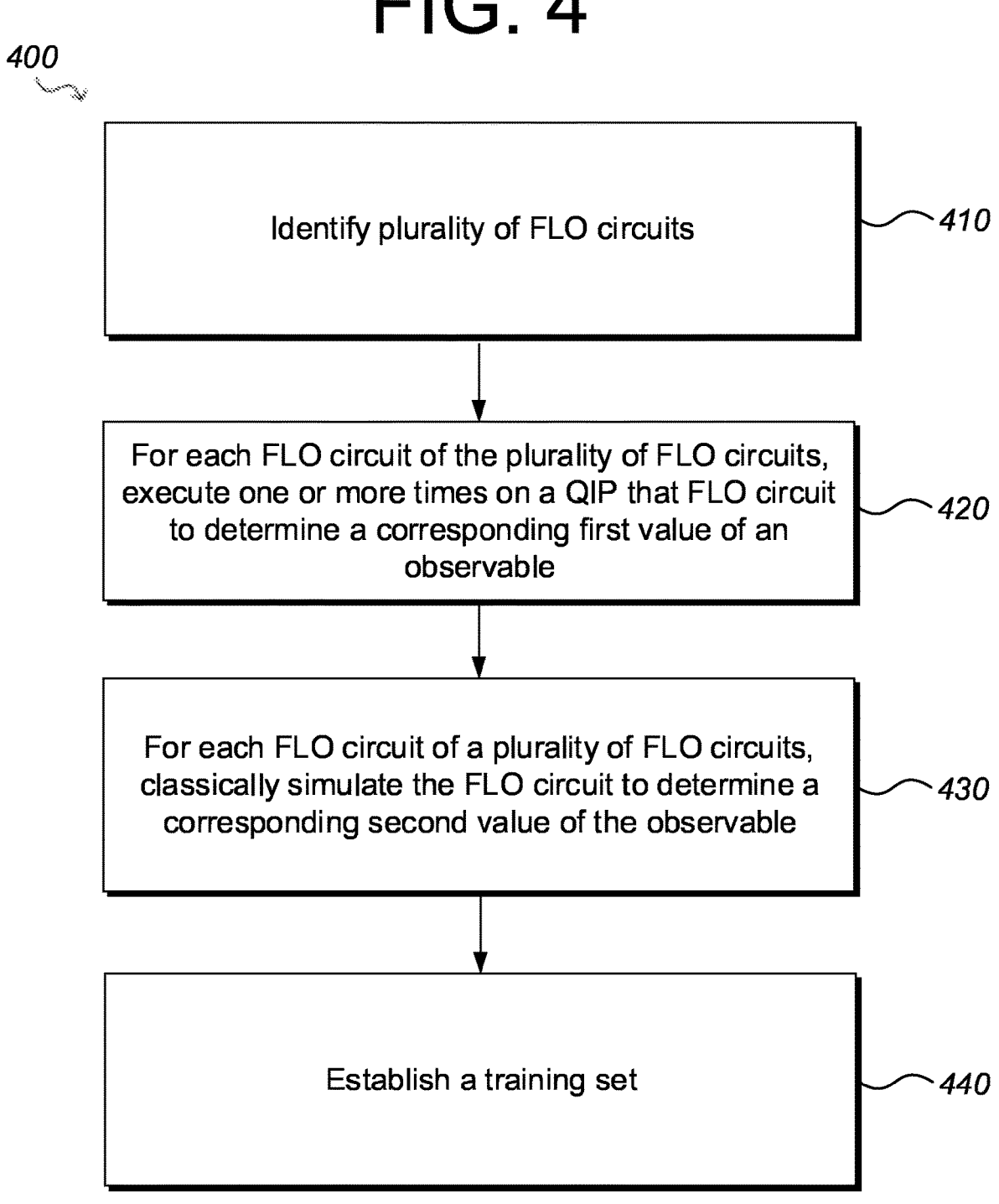

| Identify plurality of FLO circuits | ~410 |

| For each FLO circuit of the plurality of FLO circuits, execute one or more times on a QIP that FLO circuit to determine a corresponding first value of an observable | ~420 |

| For each FLO circuit of a plurality of FLO circuits, classically simulate the FLO circuit to determine a corresponding second value of the observable | ~430 |

| Establish a training set | ~440 |

*600*

Receive noisy value of an observable          ~610

Apply noise inversion function          ~620

Determine corrected value of the observable          ~630

MITIGATING ERRORS IN ALGORITHMS PERFORMED USING QUANTUM INFORMATION PROCESSORS

TECHNICAL FIELD

The present disclosure relates to quantum computing and, in particular, to mitigating errors in algorithms performed using quantum information processors.

BACKGROUND

Advances in quantum computing have ushered in an era of noisy, intermediate-scale quantum (NISQ) hardware, which can no longer be simulated effectively classically, even on the world's largest supercomputers. One of the most important application areas of near-term quantum computers is predicted to be simulating quantum mechanical systems. Quantum computers could approximate values of physical quantities which are hard to obtain classically.

However, this NISQ hardware is still extremely limited in terms of the number of qubits that can be controlled and the decoherence time—the time after which the fidelity of the qubits has degraded to the extent that the results of a performed algorithm are effectively meaningless. Currently quantum computing architectures have on the order of $\approx 50$ qubits, and are only capable of implementing quantum circuits up to a depth of order $\approx 50$ before decoherence renders the results meaningless. Critical factors that determine the feasibility of performing an algorithm include its qubit requirements (e.g. the number of qubits required and the ability to control interactions between them), its gate cost and its circuit depth (a measure of algorithm runtime).

NISQ quantum computers are affected by noise and errors which can lead to highly inaccurate results being produced. Standard quantum fault-tolerance techniques introduce significant overheads in terms of both the number of qubits required and the associated gate cost, and so such techniques are unsuitable for the NISQ regime.

To at least partially alleviate the burden of such challenges, several classical-quantum hybrid algorithms have been proposed. In a classical-quantum hybrid algorithm, both classical and quantum resources are used to perform a computational task.

One non-trivial example is the Variational Quantum Eigensolver (VQE) algorithm, which uses quantum and classical resources to find variational solutions to eigenvalue and optimization problems that are not accessible to traditional classical computers. More specifically, the VQE algorithm is used to find eigenvalues of a (usually large) matrix H which may represent the Hamiltonian of a physical system. A quantum subroutine is run inside of a classical optimization loop. The quantum subroutine comprises preparing an ansatz quantum state $|\psi(\omega)\rangle$ parametrised by a parameter $\omega$ and measuring the expectation value $\langle \psi(\omega)| H\psi(\omega)\rangle$. The variational principle ensures that this expectation value is always greater than the smallest eigenvalue of the matrix H. In the classical optimization loop, the parameter to can be iteratively adjusted until a convergence condition is met.

Nevertheless, any routines or subroutines of hybrid algorithms such as VQE that are performed on a NISQ quantum computer are still affected greatly by noise.

The present invention has been devised in the foregoing context.

SUMMARY

According to an aspect of the invention, a method is provided for mitigating errors caused by noise in an algorithm executed using a quantum information processor. The method comprises, for each fermionic linear optics (FLO) circuit of a plurality of FLO circuits, (i) executing, one or more times using the quantum information processor, that FLO circuit to determine a first value of an observable; and (ii) classically simulating that FLO circuit to determine a second value of the observable. The method further comprises establishing a training set comprising a plurality of tuples, each tuple comprising a set of one or more parameters for defining a FLO circuit of the plurality of FLO circuits, the corresponding first value of the observable determined for that FLO circuit, and the corresponding second value of the observable determined for that FLO circuit. The method further comprises determining, using the training set, a noise inversion function. The method further comprises executing, one or more times using the quantum information processor, a quantum circuit for implementing at least a part of the algorithm to determine a noisy value of an observable. The method further comprises applying the noise inversion function to the noisy value. The method further comprises determining, from the output of the noise inversion function, a corrected value of the observable.

A routine/subroutine for performance on a quantum information processor can be represented by a quantum circuit. A quantum circuit is a model for quantum computation in which a computation is a sequence of quantum (logic) gates—transformations on a register of qubits. Accordingly, a quantum circuit is understood to mean a step-by-step sequence of operations for solving a problem on a quantum information processor.

FLO circuits are a particular class of quantum circuit. In particular a FLO circuit is a quantum circuit for which all gates are of the form $\exp[iH_q]$ where $H_q$ denotes a quadratic fermionic Hamiltonian. The fermionic Hamiltonian may be mapped onto the qubits of the quantum information processor in many different ways according to a chosen fermion-to-qubit encoding (e.g. the Jordan-Wigner transform). That is, the same gate $\exp[iH_q]$ may be represented by any of several different sequences of qubit operations. For notational convenience FLO quantum circuits are referred to herein only as FLO circuits and references to the "quantum circuit" are understood to mean a quantum circuit of the algorithm and not to the FLO circuits used in establishing the training set.

An algorithm for execution using a quantum information processor may comprise a set of routines and procedures that are only implemented on a quantum information processor, or may comprise a mixture of operations/routines, some for performance on classical processing means and others for performance using the quantum information processor (i.e. a classical-quantum hybrid algorithm). That is, an algorithm for execution using a quantum information processor may comprise one or more quantum circuits for execution on the quantum information processor. For example, within the VQE algorithm, a first quantum circuit may be used to determine an expectation value for a first set of parameters $\langle (\psi(\omega_1)|H|\psi(\omega_1)\rangle$ and a second circuit may be used to determine an expectation value for a second set of parameters $\langle \omega(\omega_2)|H|\psi(\omega_2)\rangle$ within the classical optimisation loop.

An "observable" is a physical quantity that can be measured, such as energy, position or momentum or a function of such physical quantities.

It is known that FLO circuits can be simulated efficiently classically (P. Valiant, SIAM J. Comput., vol. 31, pp 1229-1254, 2002; B. Terhal and D. DiVincenzo, Phys. Rev. A. vol. 65, 032325, 2002) and so classical processing means can be used to determine a true value for the observable that should result from a given FLO circuit. Accordingly, by building a training set including pairs of observable values, one determined using classical means and one determined using the quantum information processor utilized by the algorithm of interest, a useful noise inversion function can be generated which can be used to mitigate errors caused by noise when implementing the target algorithm. It is demonstrated herein that such an approach (often referred to herein as "Training by Fermionic Linear Optics" or "TFLO") can be used to reduce errors.

The methods described herein give rise to numerous advantages. Advantageously, the methods described herein provide a framework to ensure that any noise inversion functions are tailored both to the algorithm itself (in selecting the FLO circuits), and to the quantum information processor with which the algorithm is executed (as the quantum information processor is used also in establishing the training set).

One notable advantage is that error mitigation can be performed post-hoc—that is the noisy values can be corrected after the algorithm is performed using the quantum information processor. Another notable advantage is that the error mitigation can be performed without changing the quantum circuit executed as at least a part of the algorithm.

Furthermore, FLO is a distinct class of quantum circuits and is closely related to algorithms for simulating fermionic systems, making the methods described herein particularly useful for mitigating errors in simulations of fermionic systems (although they are more widely applicable to other algorithms also). Additionally, the TFLO process described herein does not depend on the form in which a fermionic Hamiltonian is encoded/mapped onto the qubits of the quantum information processor.

It has been found that the use of FLO circuits to establish a training set advantageously improves the accuracy of a resulting determined noise inversion function, when compared to using other forms of circuit. This is because, in many applications, FLO circuits can be used to more accurately approximate a target quantum circuit for which the noise inversion circuit is to be determined. For example, a Clifford circuit comprising only Clifford gates may be simulated classically and could therefore be used to generate a noise inversion function. However, the inventors have realised that it is often difficult to establish an approximation of a target quantum circuit of interest using only Clifford gates. For example, a target quantum circuit of interest may include many non-Clifford gates and as such a Clifford circuit including only Clifford gates may be a poor representation of the target quantum circuit. Consequently, the noise behaviour of a Clifford circuit may be very different to the noise behaviour of the target quantum circuit and thus a noise inversion function generated using Clifford circuits may not accurately correct for the true noise experienced by the target quantum circuit of interest.

The inventors have realised that, in many applications, FLO circuits may advantageously be used to better approximate the noise behaviour of a target quantum circuit of interest. Consequently, a noise inversion function generated using FLO circuits may better represent the true noise behaviour of the target quantum circuit of interest and the accuracy of any resulting noise correction may be improved. This may, in particular be the case for target quantum circuits which are configured to simulate a fermionic system. Such quantum circuits may be closely approximated by an FLO circuit. Consequently, a training set established using FLO circuits may represent a close approximation of the noise behaviour of the target quantum circuit and the resulting noise inversion function may be used to correct for noise with increased accuracy.

According to one or more examples described herein, the algorithm may be configured to simulate a fermionic system.

According to one or more examples described herein, each FLO circuit of the plurality of FLO circuits may approximate the quantum circuit. Preferably, noise in the FLO circuits behaves similarly to noise in the target quantum circuit when implemented on that quantum information processor. References herein to an FLO circuit which approximates a target quantum circuit may be taken to mean that the noise in the FLO circuit behaves similarly to noise in the target quantum circuit. Consequently, the noise experienced by the FLO circuit approximates the noise experienced by the target quantum circuit.

According to one or more examples described herein, the method may comprise determining a plurality of FLO circuits which approximate the quantum circuit. The determined plurality of FLO circuits may then be executed and classically simulated in order to establish the training set.

According to one or more examples described herein, the quantum circuit may include one or more FLO gates, and FLO circuits of the plurality of FLO circuits may preserve the location and/or parameters of one or more of those FLO gates.

When FLO circuits are represented by the Jordan-Wigner transform, allowed operations on pairs of consecutive qubits are known as matchgates and correspond to pairs of SU(2) unitary operations acting on each of the even and odd parity subspaces. In the TFLO method one may use as training data any family of quantum circuits which consist of matchgates acting on consecutive qubits (in the quantum circuit representation). Advantageously, the use of matchgates extends the applicability of TFLO beyond quantum algorithms for simulating fermionic systems, to mitigating errors in more general quantum algorithms that include many matchgates. Some mild generalisations of matchgate circuits are known to also be classically simulable and these families of circuits could also be used within the framework described herein.

According to one or more examples described herein, FLO circuits of the plurality of FLO circuits may consist of matchgates acting on consecutive qubits of the quantum information processor.

The noise inversion function may require as input only a value of the observable (e.g. the noisy value), or may also require as input one or more parameters for defining the quantum circuit. According to one or more examples described herein, applying the noise inversion function to the noisy value may comprise providing the noisy value and, optionally, one or more parameters defining the quantum circuit as input to the noise inversion function.

According to one or more examples described herein, determining a noise inversion function may comprise performing a linear regression. Advantageously, and as will be described in further detail herein, linear regression provides an affine map that suits many physically reasonable noise maps. Furthermore, a noise inversion function determined using linear regression is useful when combined with gradient-based outer optimisation algorithms in VQE, such as simultaneous perturbation stochastic optimisation (SPSA) or gradient descent.

According to one or more examples described herein, determining a noise inversion function may comprise training a machine learning algorithm to learn a model for mapping a first value of the observable determined from one or more executions, using the quantum information processor, of a FLO circuit to a second value of the observable determined from a classical simulation of the FLO circuit. Advantageously, a trained machine learning model (for example a trained neural network) can pick up a more subtle relationship between the first and second values of the observables in the training set than is possible using a linear regression, and/or may be better suited to certain quantum information processor architectures for which noise is not easily modellable as an affine map.

According to one or more examples described herein, the observable may comprise the energy of a quantum state with respect to a given quantum Hamiltonian.

According to one or more examples described herein, the algorithm may comprise a classical-quantum hybrid algorithm such as the variational quantum eigensolver (VQE) algorithm.

According to an aspect of the invention, a method is provided for mitigating errors caused by noise in an algorithm executed using a quantum information processor. The method comprises receiving a noisy value of an observable, the noisy value determined from one or more executions, using the quantum information processor, of a quantum circuit for implementing at least a part of the algorithm. The method further comprises applying a noise inversion function to the noisy value. The method further comprises determining, from the output of the noise inversion function, a corrected value of the observable. The noise inversion function is determined from a training set comprising a plurality of tuples, wherein each tuple comprises (i) a set of one or more parameters for defining a fermionic linear optics (FLO) circuit, (ii) a corresponding first value of the observable, the first value determined from one or more executions, using the quantum information processor, of that FLO circuit, and (iii) a corresponding second value of the observable, the second value determined from a classical simulation of that FLO circuit.

According to an aspect of the invention, a method is provided for establishing a training set, the training set usable for mitigating errors caused by noise in an algorithm executed using a quantum information processor. The method comprises, for each fermionic linear optics (FLO) circuit of a plurality of FLO circuits, (i) executing, one or more times using the quantum information processor, that FLO circuit to determine a first value of an observable; and (ii) classically simulating that FLO circuit to determine a second value of the observable. The training set comprises a plurality of tuples, each tuple comprising (i) a set of one or more parameters for defining a FLO circuit of the plurality of FLO circuits, (ii) the corresponding first value of the observable determined for that FLO circuit, and (iii) the corresponding second value of the observable determined for that FLO circuit.

According to an aspect of the invention, a method is provided for generating a noise inversion function for mitigating noise in an algorithm executed using a quantum information processor. The method comprises receiving a training set comprising a plurality of tuples, wherein each tuple comprises (i) a set of one or more parameters for defining a fermionic linear optics (FLO) circuit, (ii) a corresponding first value of an observable determined from one or more executions, using the quantum information processor, of that FLO circuit, and (iii) a corresponding second value of the observable, the second value determined from a classical simulation of that FLO circuit. The method further comprises training a machine learning algorithm, using the tuples, to learn a model for mapping a first value of the observable determined from one or more executions, using the quantum information processor, of a FLO circuit to a second value of the observable determined from a classical simulation of the FLO circuit. The method further comprises outputting the trained model as a noise inversion function.

According to an aspect of the invention, a method is provided for mitigating errors caused by noise in an algorithm executed using a quantum information processor. The method comprises, determining a plurality of fermionic linear optics (FLO) circuits which approximate a quantum circuit for implementing at least a part of the algorithm. The method further comprises, for each FLO circuit of the determined plurality of FLO circuits, (i) executing, one or more times using the quantum information processor, that FLO circuit to determine a first value of an observable; and (ii) classically simulating that FLO circuit to determine a second value of the observable. The method further comprises establishing a training set comprising a plurality of tuples, each tuple comprising a set of one or more parameters for defining a FLO circuit of the plurality of FLO circuits, the corresponding first value of the observable determined for that FLO circuit, and the corresponding second value of the observable determined for that FLO circuit. The method further comprises determining, using the training set, a noise inversion function. The method further comprises executing, one or more times using the quantum information processor, the quantum circuit for implementing at least a part of the algorithm to determine a noisy value of an observable. The method further comprises applying the noise inversion function to the noisy value. The method further comprises determining, from the output of the noise inversion function, a corrected value of the observable.

According to an aspect of the invention, a computer readable medium is provided. The computer readable medium has instructions stored thereon which, when read by a processor of a computing apparatus, cause the computing apparatus to perform a method as described herein.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

According to an aspect of the invention, a computing apparatus is provided. The computing apparatus comprises one or more memories. The computing apparatus further comprises one or more classical processors configured to execute instructions stored in the one or more memory units to perform a method as described herein.

The computing apparatus may further comprise a quantum information processor, the quantum information processor configured to execute the quantum circuit for implementing the algorithm. The quantum information processor may further be configured to execute a fermionic linear optics (FLO) circuit to determine a value of an observable.

The computing apparatus may further comprise interaction means for interacting with the quantum information processor.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Embodiments of the invention are further described hereinafter with reference to the accompanying drawings, in which:

FIG. 4 shows a flowchart of a method of establishing a training set;

Throughout the description and the drawings, like reference numerals refer to like parts.

DETAILED DESCRIPTION

Quantum information processing focuses on information processing and computing based on quantum mechanics. While current digital computers encode data in binary digits (bits), quantum computers are not limited to two states. They encode information as quantum bits, or qubits, which can exist in superposition. A qubit is a unit of quantum information. Qubits may be implemented with atoms, ions, photons or electrons (for example) and suitable control devices for example that work together to act as computer memory and a processor. In what follows, the terms quantum information processor and quantum computer have been used interchangeably. It is to be understood that a quantum information processor comprises a plurality of qubits and the apparatus required to maintain the qubits in a superposition state. In what follows, the term "controller apparatus" has been used to describe classical computing apparatus having, for example, classical processing capabilities and the ability to control interaction means for interacting with the qubits of the quantum information processor. In this way, a controller apparatus may control input to and receive output from the quantum information processor.

The quantum computing architecture, and accordingly the types of interaction means required to interact with the quantum information processor, do not matter for the purposes of the following discussion.

Figure 1:
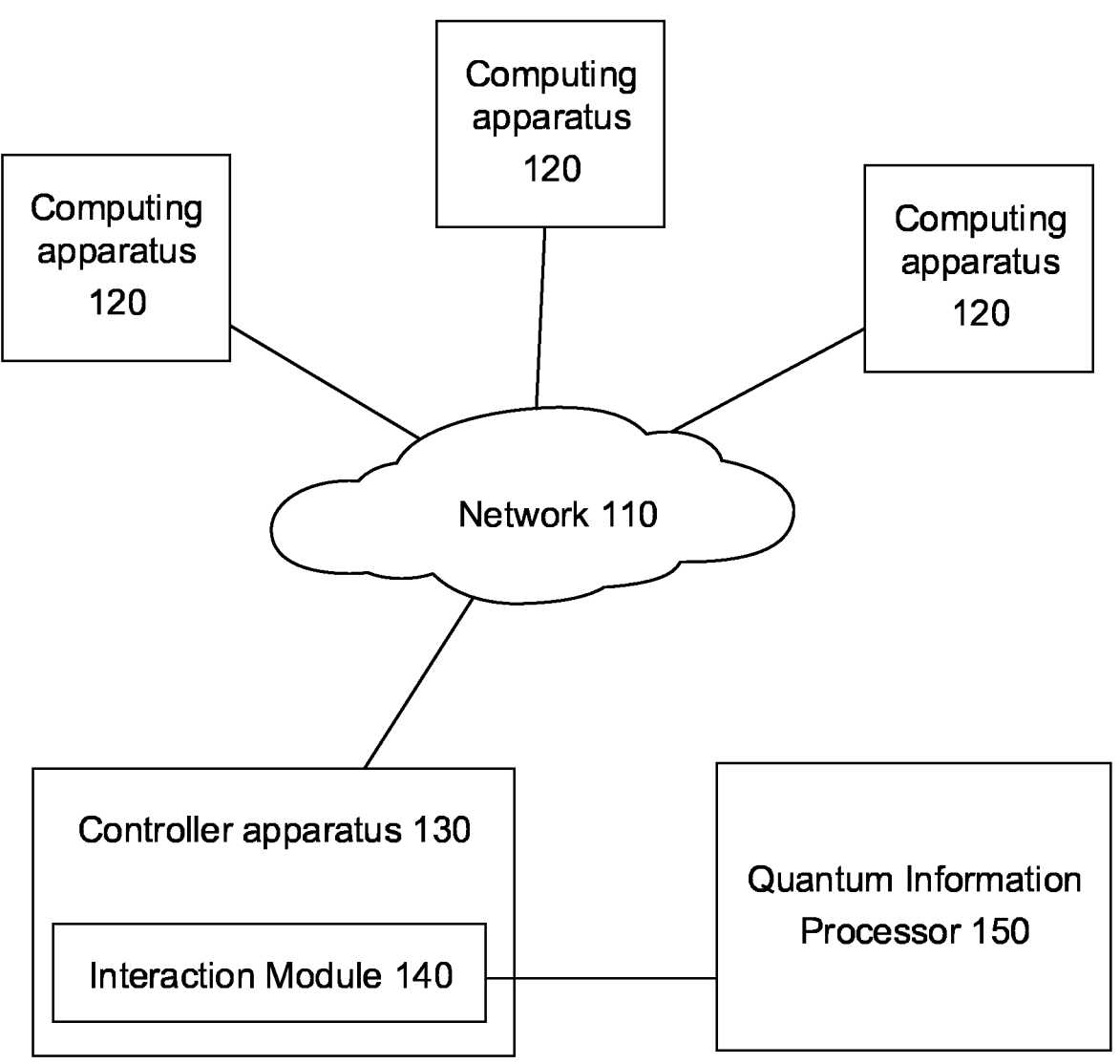
FIG. 1 illustrates a communication system including a quantum information processor.

FIG. 1 shows a computer system 100 in accordance with the present disclosure. The computer system 100 comprises one or more computing apparatuses 120, a network 110, a controller apparatus 130 and a quantum information processor 150.

The one or more computer apparatuses 120 and the controller apparatus 130 can communicate with each other over the network 110. The network 110 may be any known type of computer network, enabling wired or wireless communication between computer apparatus 120 and the controller apparatus 130, and could be for example, a Local Area Network (LAN), a Wide Area Network (WAN), or the Internet.

The computer apparatus 120 is able to generate or store locally, or receive and transmit over the network 110, a whole or part of a control sequence for performing qubit operations (quantum operations) on the quantum information processor 150.

The controller apparatus 130 is able to generate or receive from computing apparatus 120 a control sequence for performing operations on the quantum information processor 150. The controller apparatus 130 is able to interact directly with the quantum computer 150 via interaction module 140 according to a control sequence.

The quantum information processor 150 can be any device which is able to store and manipulate qubits. The quantum information processor 150 may have any type of architecture, and may generate qubits using any known method, including, but not limited to the following methods: nuclear magnetic resonance, ion traps, superconductors, quantum dots, electrons on liquid helium, solid-state spin spectroscopy, cavity QED. The quantum information processor 150 may process logical qubits encoded on multiple physical qubits using a quantum error correcting code. The quantum information processor 150 may generate and manipulate qubits according to a control sequence applied by the controller apparatus 130.

The skilled person would appreciate that other set-ups to that shown in FIG. 1 may be suitable. For example, the controller apparatus 130 and the quantum information processor 150 may be combined in one unit. The computing apparatus 120 may not be necessary—for example, the controller apparatus 130 may itself perform methods as described herein.

Figure 2:
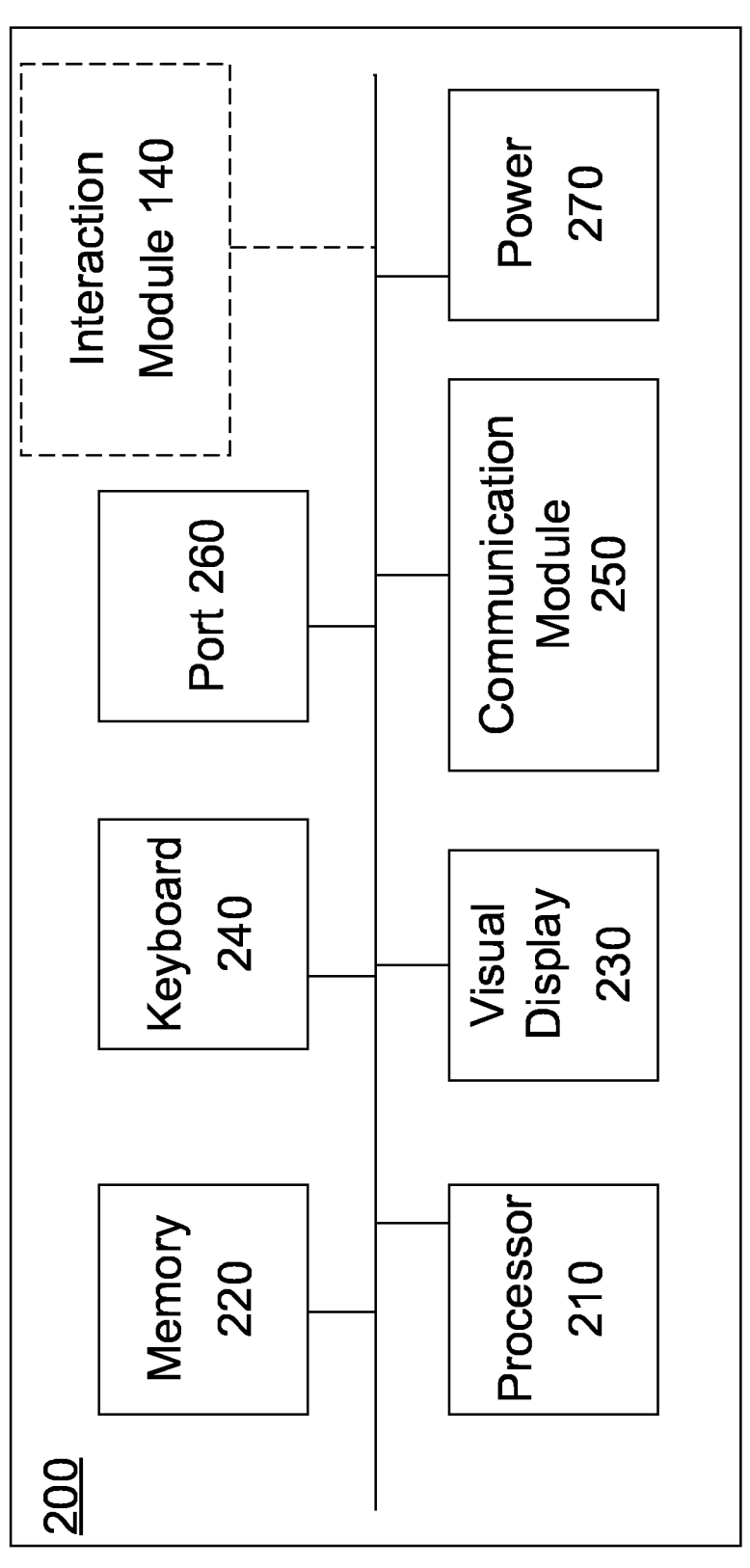
FIG. 2 shows a schematic of a computing device/computing apparatus.

FIG. 2 is a block diagram of a computing apparatus 200. For example, computing apparatus 200 may comprise a computing device, a server, a mobile or portable computer and so on. Computing apparatus 200 may be distributed across multiple connected devices.

Computing apparatus 200 may be suitable for use as computing apparatus 120 of FIG. 1. Computing apparatus 200 may be suitable for use as controller apparatus 130 of FIG. 1. Other architectures to that shown in FIG. 2 may be used as will be appreciated by the skilled person.

Referring to the figure, computing apparatus 200 includes one or more classical processors 210, one or more memories 220, a number of optional user interfaces such as visual display 230 and virtual or physical keyboard 240, a communications module 250, and optionally a port 260 and optionally a power source 270. Each of components 210, 220, 230, 240, 250, 260, and 270 are interconnected using various busses. Processor 210 can process instructions for execution within the computing apparatus 200, including instructions stored in memory 220, received via communications module 250, or via port 260.

Memory 220 is for storing data within computing apparatus 200. The one or more memories 220 may include a volatile memory unit or units. The one or more memories may include a non-volatile memory unit or units. The one or more memories 220 may also be another form of computer-readable medium, such as a magnetic or optical disk. One or more memories 220 may provide mass storage for the computing apparatus 200. Instructions for performing a method as described herein may be stored within the one or more memories 220. For example, the memory 220 may contain instructions for establishing a training set as described herein and may contain instructions for mitigating errors caused by noise in an algorithm implemented using the quantum information processor 150

The apparatus 200 includes a number of user interfaces including visualising means such as a visual display 230 and a virtual or dedicated user input device such as keyboard 240.

The communications module 250 is suitable for sending and receiving communications between processor 210 and remote systems. For example, communications module 250 may be used to send and receive communications via a communication network 110 such as the Internet.

The port 260 is suitable for receiving, for example, a non-transitory computer readable medium containing instructions to be processed by the processor 210.

The processor 210 is configured to receive data, access the memory 220, and to act upon instructions received either from said memory 220 or a computer-readable storage medium connected to port 260, from communications module 250 or from user input device 240.

In some examples, computing apparatus may include interaction module 140. The interaction module 140 is suitable for interacting with a quantum information processor/quantum computer 150. The interaction module 140 may be used to generate an initial quantum state on the quantum information processor 150, and may be used to manipulate the qubits of the quantum information processor/quantum computer. The interaction module 140 may be used to read out a state of the quantum information processor 150, for example a value of an observable. The form and characteristics of the interaction means 140 depends on the type of quantum information processor 150 being used to process quantum information, and examples of quantum information processors are described below. For example, if the quantum information processor 150 comprises an ion trap quantum computer then the interaction means 140 may comprise one or more lasers for preparing an initial quantum state via e.g. optical pumping, and may comprise apparatus for manipulating magnetic dipole transitions or stimulated Raman transitions or apparatus for manipulating electric quadrupole transitions, in order to manipulate the quantum state. For example, if the quantum computer comprises a superconducting quantum computer then the interaction means 140 may comprise circuitry to apply a voltage across a particular point in the superconducting circuit or apparatus for coordinating microwave pulses applied to the superconducting quantum computer. The quantum information processor 150 may comprise any type of quantum information processor and the corresponding interaction means 140 may comprise any means suitable for interaction with the qubits of the quantum information processor 150.

The processor 210 may be configured to control the interaction module 140 according to a control sequence. The processor 210 may determine the control sequence locally according to any method of determining a control sequence described herein, or may receive the control sequence from an external computer apparatus 120, or via a computer-readable medium with the control sequence stored thereon being connected with the port 260.

According to an example, a user of computing apparatus 120 may seek to execute a quantum circuit on quantum information processor 150. The computing apparatus 120 may determine a control sequence for performance on a quantum information processor/quantum computer 150. The computing apparatus 120 may communicate via network 110 to controller apparatus 130 which may then control the execution of the quantum circuit on the quantum information processor 150 via interaction means 140. The results may then be communicated back to the computing apparatus 120 for provision to the user. Of course, the skilled person would appreciate that the external computing apparatus 120 is not necessary—for example, the user may interact directly with the control apparatus 130.

Figure 3:
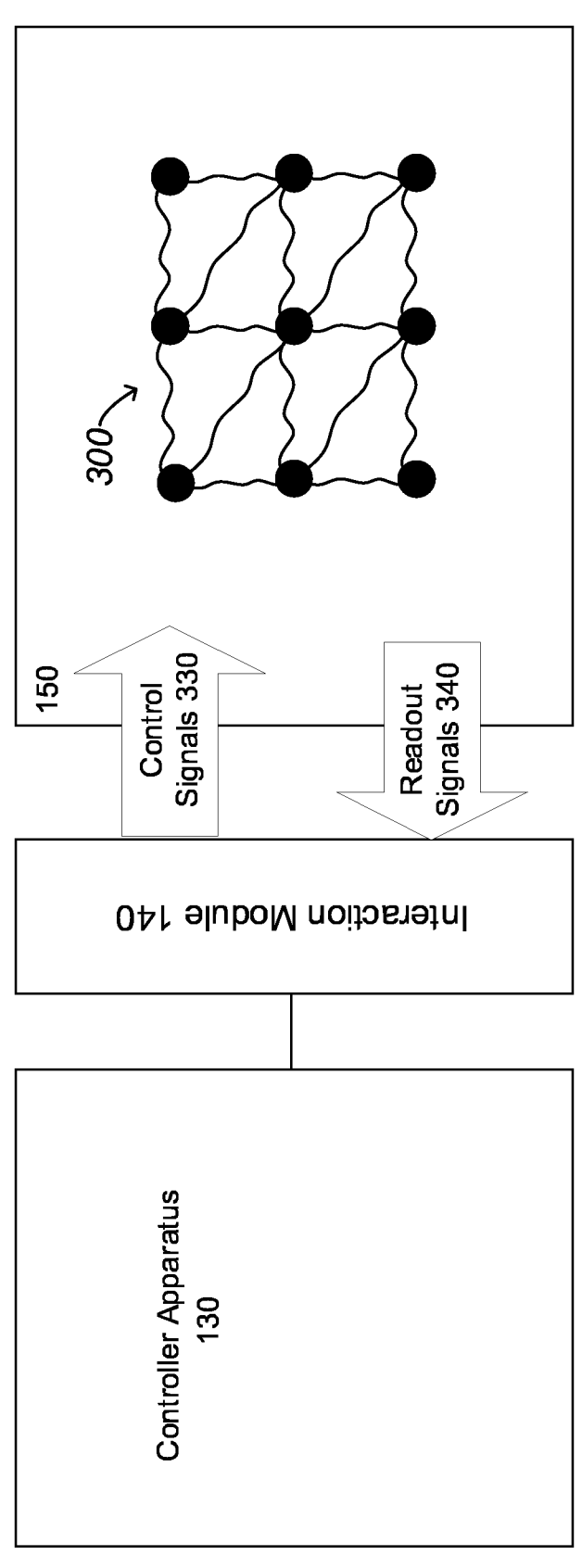
FIG. 3 illustrates a controller apparatus and quantum information processor.

FIG. 3 shows a controller apparatus 130 and quantum information processor 150 in more detail. The controller apparatus 130 is configured to control the quantum information processor 150 via interaction module 140. In FIG. 3, the interaction module 140 is shown as external to the controller apparatus 130. The interaction module 140 may be internal to the controller apparatus 130 (such as in FIG. 2) or may be external to the controller apparatus 130.

The quantum information processor 150 comprises a plurality of qubits 300. In FIG. 3 possible interactions between qubits are represented by the wavy lines. The skilled person would appreciate that the quantum information processor 150 of FIG. 3 is illustrative only. The quantum information processor may comprise more or fewer qubits and the configuration of the qubits may be any suitable configuration. The controller apparatus 130 is configured to use the interaction module 140 to send control signals 330 to control the qubits 300 of the quantum information processor 150. The controller apparatus 130 is further configured to receive readout signals 340 from measurements of the quantum information processor 150.

One of the most important application areas of near-term quantum computers is predicted to be simulating quantum-mechanical systems (although the methods described herein are applicable to other problems also). Quantum computers could approximate values of physical quantities which are hard to obtain classically. However, near-term (Noisy Intermediate-Scale Quantum, NISQ) quantum computers are affected by noise and errors, which can lead to highly inaccurate results being produced. Standard quantum fault-tolerance techniques introduce significant overheads, rendering them unsuitable for the NISQ regime.

There are several known methods for error mitigation in NISQ quantum computers (for examples see (i) Temme et al., Phys. Rev. Lett., vol. 119, 180509, 2017; (ii) Cai, arXiv: 2007.01265, 2020; (iii) Czarnik et al., arXiv: 2011.01382, 2020; (iv) Endo et al., Phys. Rev. X, vol. 8, 031027, 2018; (v) McArdle et al., Phys. Rev. Lett. Vol. 122, 180501, 2019; (vi) Bonet-Monroig et al., Phys. Rev. A, vol. 98, 062339, 2018; (vii) Huggins et al., arXiv: 1907.13117, 2019). The methods described herein have advantages over the known noise mitigation methods including the ability to mitigate errors post-hoc, the fact that the quantum circuit of the target algorithm does not need to be altered, and the particular suitability of such methods to the simulation of physical systems.

In the following discussion the focus is on a family of error mitigation techniques which are applicable when one aims to compute a value $E(\theta)$ where $\theta$ is a sequence of parameters specifying a particular quantum circuit $C(\theta)$. For example, in the VQE algorithm, $E(\theta)$ is the energy of a state produced by a quantum circuit $C(\theta)$, with respect to a particular Hamiltonian H, and one optimises over $\theta$ to find the ground state of H; however, this framework is much more general than VQE.

The value E is usually referred to as an observable. After executing the quantum circuit $C(\theta)$ corresponding to $\theta$ on a quantum computer some number of times, a noisy value $\tilde{E}(\theta)$ is obtained, for example by averaging many measurement results. An objective of the methods described herein is to correct this noise.

One way to perform this correction is by obtaining "training data", in the form of tuple $(\gamma, \tilde{E}(\gamma), E(\gamma))$ for some particular choices of parameters $\gamma$, and using this information to infer a general map (noise inversion function) from $\tilde{E}(\theta)$ or $(\theta, \tilde{E}(\theta))$ to $E(\theta)$. This general technique may be referred to herein as error mitigation by training (EMT).

An accurate noise model can be as complex as a quantum circuit itself, so can be very hard to analyse or even write down classically. EMT avoids this issue by not computing a fully accurate noise model, instead just learning enough information to correct errors in a particular algorithm. In addition, EMT leaves the final circuit executed unchanged.

A major difficulty with this overall strategy is the complexity of obtaining $E(\theta)$. In general, this quantity will be hard to compute classically (or there would be no need to use a quantum computer); in computational complexity language, computing it exactly can even be #P-hard. However, for some quantum circuits $E(\theta)$ can be obtained efficiently. For example, this holds where $E(\theta)$ is produced by executing a quantum circuit containing only Clifford gates (gates which map Pauli operators to Pauli operators by conjugation), and measuring in the computational basis. More generally, circuits containing N non-Clifford gates can be handled, at the expense of a simulation runtime that grows exponentially with N.

However, to perform high-quality error mitigation using EMT, the quantum circuits used in establishing the training set T should be as similar as possible to the true quantum circuit $C(\theta)$, so that noise behaves in a similar way. A difficulty with an approach based on training using Clifford circuits is that $C(\theta)$ may contain many non-Clifford gates, or otherwise may be far from a Clifford circuit. In some architectures, such as Google's Sycamore architecture (F. Arute et al., Nature, vol. 574, pp 505-510, 2019), all the 2-qubit gates are non-Clifford gates. Accordingly it can be unclear in some cases whether there exists a good family of Clifford circuits that are representative of $C(\theta)$ in terms of noise.

Here the focus is on mitigating errors in quantum circuits for simulating fermionic systems. Such quantum circuits are often of a special form, and are largely or completely made up of unitary operations of the form $e^{iH}$, where H is a representation of a fermionic Hamiltonian. For example, this holds for circuits for simulating time-dynamics of a fermionic Hamiltonian based on Trotterisation, and for some families of circuits used in variational algorithms for preparing the ground state of fermionic Hamiltonians, such as the unitary coupled cluster and Hamiltonian variational ansatze.

Second quantization, also referred to as occupation number representation, is a formalism used to describe and analyse quantum many-body systems. Under second quantization, the quantum many-body states are represented in the Fock state basis, which are constructed by filling up each single-particle state with a certain number of identical particles. The second quantization formalism would be known to the skilled person and introduces the creation and annihilation operators to construct and handle the Fock states. Quantum operations on fermionic systems can be characterised entirely by fermionic quantum operators, which can in turn be described by the actions of the annihilation operators $a_j$ and creation operators $$a_j^\dagger$$

that satisfy the anticommutation relations $$[a_j, a_k]_+ = 0$$

$$\left[a_j^\dagger, a_k^\dagger\right]_+ = 0$$

$$\left[a_j, a_k^\dagger\right]_+ = \delta_{jk}$$

where $[A, B]_+ = AB + BA$ and $\delta_{jk}$ is the Kronecker delta. The annihilation operators act on the fermionic Fock space as:

$$a_j = |v_1, v_2, \ldots, v_{j-1}, 1, v_{j+1}, \ldots,$$

$$v_M\rangle = (-1)^{\sum_{s=1}^{j-1} v_s} |v_1, v_2, \ldots, v_{j-1}, 0, v_{j+1}, \ldots, v_M\rangle$$

$$a_j = |v_1, v_2, \ldots, v_{j-1}, 0, v_{j+1}, \ldots, v_M\rangle = 0$$

where $v_j \in \{0,1\}$ indicates the presence ($v_j=1$) or absence ($v_j=0$) of a fermionic particle in mode j and M describes the number of fermionic modes in the system of interest. The operator $$a_j^\dagger$$

is the Hermitian conjugate of $a_j$.

Remarkably, it is known that a quantum circuit where all gates are of the form $e^{iH}$, in the special case where the Hamiltonian is a quadratic Hamiltonian $H_q$ in fermionic creation and annihilation operators:

$$H_q = \sum_{j,k} h_{jk} a_j^\dagger a_k + \mu_{jk} a_j^\dagger a_k^\dagger + \mu_{jk}^* a_j a_k, \qquad \text{(Equation 1)}$$

can be simulated efficiently classically (P. Valiant, SIAM J. Comput., vol. 31, pp 1229-1254, 2002; B. Terhal and D. DiVincenzo, Phys. Rev. A. vol. 65, 032325, 2002; S. Bravyi and R. Koenig, Quantum Inf. Comput., vol. 12, 925-943, 2012). The family of quantum circuits of this form is often called fermionic linear optics (FLO).

In this discussion, FLO circuits finish either with a measurement of the expectation of a fermionic operator on O(1) modes containing an equal number of creation and annihilation operators (e.g. the number operator), or with a measurement in the occupation number basis.

Notably, this efficient classical simulation does not depend on any particular fermion-to-qubit mapping, also known as a fermion-to-qubit encoding. A fermion-to-qubit encoding is a mapping of fermionic modes of the problem being solved onto the qubits of the quantum information processor, and the mapping of fermionic quantum operators to qubit operators. Many fermion-to-qubit encodings are known, including the well-known Jordan-Wigner transformation, or a more recent encoding such as the Brayvi-Kitaev encoding, but this discussion will remain agnostic to the fermion-to-qubit encoding used.

If one uses the Jordan-Wigner transformation and consider an arbitrary quadratic Hamiltonian $H_q$ which interacts consecutive fermionic modes j, j+1, the corresponding unitary operations $e^{iH_q}$ are known as "matchgates". Quantum circuits consisting only of matchgates on consecutive pairs of qubits are thus classically simulable. Matchgate quantum circuits have been proposed as a method to benchmark quantum computers (Helsen et al., arXiv:2011.13048, 2020), analogously to the use of Clifford circuits in randomized benchmarking.

Given this efficient classical simulation algorithm, the training set T is defined to include parameters $\theta$ corresponding to FLO circuits, and it is possible to calculate the corresponding exact values $E(\theta)$ classically. This overall approach is referred to herein as training by fermionic linear optics (TFLO). The TFLO method can be summarised as follows:

1. Given a quantum circuit $C(\zeta)$ described by parameters $\zeta$, produce a plurality of FLO circuits that are as representative of $C(\zeta)$ as possible (e.g. by preserving FLO gates in $C(\zeta)$).
2. Execute all FLO circuits both in classical simulation and on quantum hardware, to obtain, for each FLO circuit, training data ($\gamma$, $\check{E}(\gamma)$, E ($\gamma$)) where $\gamma$ represents parameters defining a particular FLO circuit.
3. Use a machine learning or statistical method (for example, linear regression on pairs $(E(\gamma), \check{E}(\gamma))$, to infer a noise-inversion map/function from $\check{E}(\theta)$ or $(\theta, \check{E}(\theta))$ to $E(\theta)$ for arbitrary $\theta$.
4. Execute the quantum circuit $C(\zeta)$ on quantum hardware and apply the noise-inversion map to $\check{E}(\zeta)$ or the pair $(\zeta, \check{E}(\zeta))$ to obtain an approximation of $E(\zeta)$.

FIG. 4 shows a flowchart of a method 400 for establishing a training set which can be used to determine a noise inversion function for mitigating noise in an algorithm executed using a quantum information processor. That is, the method is usable for establishing a training set suitable for the TFLO process described above. The method may be performed by classical processing means with access to a quantum information processor. For example, the method may be performed by controller apparatus 130 of FIG. 1 using the interaction module 140 to execute routines where necessary on the quantum information processor 150. As an alternative, the method may be performed by a computing apparatus 120 able to communicate over a network 110 with a controller apparatus 130 to execute quantum circuits where necessary on the quantum information processor 150.

The algorithm may be a fully quantum algorithm or may be a classical-quantum hybrid algorithm. The algorithm consists of, comprises, or includes one or more quantum circuits.

At 410, a plurality of fermionic linear optics (FLO) circuits is identified. For example, the plurality of FLO circuits may be identified from information received from a third party, or may be determined from analysing a target quantum circuit $C(\zeta)$ of the algorithm. Identifying the plurality of FLO circuits at 410 may comprise determining a plurality of FLO circuits which approximate the target quantum circuit $C(\zeta)$ of the algorithm. That is, the target quantum circuit $C(\zeta)$ of the algorithm may be analysed and the plurality of FLO circuits determined which approximate the target quantum circuit $C(\zeta)$ of the algorithm. An FLO circuit which approximates the target quantum circuit $C(\zeta)$ of the algorithm may be an FLO circuit for which noise behaves similarly to noise in the target quantum circuit $C(\zeta)$ of the algorithm. Consequently, the noise experienced by the FLO circuit approximates the noise experienced by the target quantum circuit $C(\zeta)$.

FLO circuits preferably are as representative of the target quantum circuit $C(\zeta)$ as possible. For example, each FLO circuit of the plurality of FLO circuits may approximate the quantum circuit C($\zeta$). The quantum circuit C($\zeta$) may include one or more FLO gates and FLO circuits of the plurality of FLO circuits may preserve the location and/or parameters of those FLO gates. The FLO circuits may consist of match-gates.

The selection of FLO circuits will depend on the algorithm. An example procedure to determine a plurality of FLO circuits which approximates the target quantum circuit C (I) of the algorithm will now be described. Such an approach, may be particularly appropriate for algorithms for simulating fermionic quantum systems. First, operations in the quantum circuit C($\zeta$) of the algorithm which are FLO operations and/or gates may be identified. Dependent on the algorithm, this may be achievable at a low level by looking at individual gates. Alternatively, higher-level primitives in the algorithm may be considered in order to identify FLO operations in the algorithm. For example, the algorithm may contain a step corresponding to time-evolution according to a quadratic fermionic Hamiltonian, which is implemented via several quantum gates that are not FLO operations themselves. Next, all non-FLO operations may be removed from the target quantum circuit. The resulting circuit (with non-FLO operations and/or gates removed) may be very different to the original target circuit in terms of its computational behaviour. However if there are relatively few non-FLO operations, then the circuit (with non-FLO operations removed) may experience similar errors to the original target circuit. The circuit with non-FLO operations removed may then be advantageous for training purposes since it provides a close approximation to the errors in the original target circuit and thus enables a higher-quality noise inversion function to be determined.

Using the procedure outlined above, an individual FLO circuit which approximates the original target quantum circuit C($\zeta$) is determined. To produce a plurality of FLO circuits which can be used as training data, the parameters of the remaining FLO gates as described in Equation 1 can be replaced with other parameters. To increase the accuracy of the inferred noise inversion function, it is advantageous to choose a set of parameters $\gamma$ such that the corresponding observable values E($\gamma$) are widely spaced out. This can be done by choosing parameters at random, or based on evaluating the FLO circuits classically at a range of parameters, and choosing a subset of choices of parameters such that the corresponding observable values E are widely spaced out. The resulting circuits still have a similar overall structure to the original circuit, so are expected to retain similar behaviour of errors.

Thus far, the discussion has been at a very general level. A specific example will briefly be described to demonstrate how one may identify FLO circuits. The famous Fermi-Hubbard model is now described. This model is defined by the Hamiltonian $$H = -t\sum\nolimits_{\langle p,q\rangle,\sigma}\left(a_{p\sigma}^{\dagger}a_{q\sigma} + a_{q\sigma}^{\dagger}a_{p\sigma}\right) + U\sum\nolimits_{k}n_{k\uparrow}n_{k\downarrow} \quad \text{(Equation 2)}$$

where the notation $\langle p,q\rangle$ denotes sites that are adjacent on an $n_x \times n_y$ lattice, and $\sigma \in \{\uparrow,\downarrow\}$.

The VQE algorithm aims to find the ground state of this Hamiltonian by optimising over quantum circuits of a particular form ("ansatz"). One prominent quantum circuit family used is called the Hamiltonian variational (HV) ansatz (Wecker et al. Phys. Rev. A, vol. 92, number 4, 2015). A quantum circuit in the HV ansatz begins by preparing the ground state of the noninteracting Hubbard model (the case U=0); it is known that this can be achieved using a FLO circuit.

The rest of the circuit consists of layers of gates corresponding to time-evolution by each of the terms in the Hamiltonian of Equation 2 in some fixed order. Each gate in the circuit is then of the form exp $$\left[i\Theta_h\left(a_j^{\dagger}a_k + a_k^{\dagger}a_j\right)\right]$$

(for the hopping terms) or exp $[i\Theta_o(n_j n_k)]$ (for the onsite terms). To produce a FLO circuit for training purposes, only the gates corresponding to onsite terms need to be removed from the circuit, corresponding to setting the $\Theta_o$ parameters to zero. For an n×n lattice, there are 4n(n−1) hopping terms and $n^2$ onsite terms, so only around one fifth of the parameters need to be set to zero. To obtain a plurality of FLO circuits for training purposes, the parameters of the remaining hopping term gates can be chosen randomly. The resulting circuits have a similar layout to the original Fermi-Hubbard VQE circuit, and hence should experience similar error behaviour, but only contain FLO gates (which can be simulated classically). This advantageously enables a training set to be established which closely approximates the error behaviour of the original target quantum algorithm.

The last step in the VQE algorithm is to measure the energy of the state prepared with respect to H, by measuring each of the terms in Equation 2.

Figure 5:
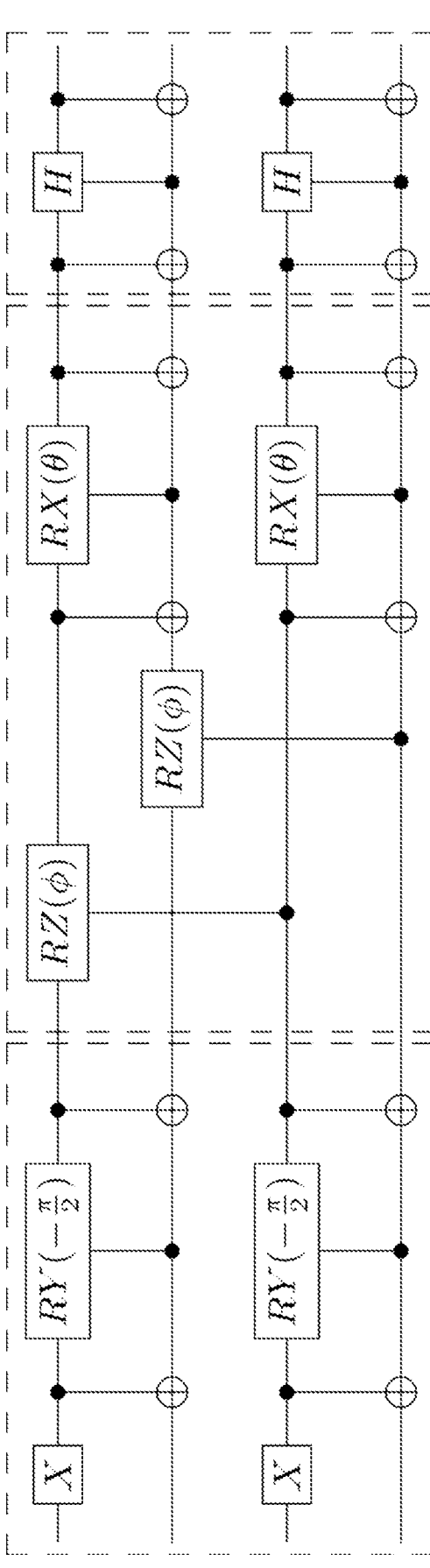
FIG. 5 shows an illustration of an example Hamiltonian variational ansatz circuit for one layer of the 2×1 Hubbard model under the Jordan-Wigner transform.

FIG. 5 shows an illustration of the HV ansatz circuit for a simple (2×1) instance of the Fermi-Hubbard model under the Jordan-Wigner transform, with initial state preparation (leftmost dashed box), ansatz (middle dashed box), and measurement (rightmost dashed box) shown (where the last step only happens for hopping term measurements). The circuit starts in the state $|0\rangle^{\otimes 4}$, finishes with a measurement in the computational basis, and has two variational parameters: $\varphi$ for the onsite term and $\theta$ for the hopping term. The controlled-RX and controlled-RZ gates can be decomposed further into hardware-native transformations. This quantum circuit was used to implement the VQE algorithm for this instance of the Fermi-Hubbard model on Rigetti quantum computing hardware. One can obtain a FLO circuit from this circuit by setting $\phi$=0. Note that, on some quantum hardware platforms such as the Rigetti platform, the controlled-phase gates depending on $\phi$ and $\theta$ would actually be implemented using two CNOT gates and a single-qubit rotation gate depending on $\phi$ or $\theta$. So the corresponding FLO circuit leaves all the two-qubit gates unchanged.

Accordingly, it has been demonstrated that one can identify suitable FLO circuits.

Returning to FIG. 4, at 420 the method 400 comprises, for each FLO circuit of the plurality of FLO circuits, executing one or more times on a quantum information processor 150 that FLO circuit to determine a corresponding first value of an observable. Executing the FLO circuit is understood to mean causing the FLO circuit to be implemented on the quantum information processor 150. For example, the computing apparatus 120 may execute the FLO circuit on the quantum information processor 150 by sending instructions including the set of parameters $\gamma$ defining that FLO circuit over the network 110 to the controller apparatus 130, which in turn uses the interaction module 140 to implement the FLO circuit on the quantum information processor.

The first value of the observable may comprise, for example, a mean value of the observable as determined from multiple executions of the FLO circuit on the quantum information processor. As the first value of the observable is determined using the quantum information processor, it is inherently a noisy value of the observable (denoted $E(\gamma)$).

At 430, the method comprises, for each FLO circuit of the plurality of FLO circuits, classically simulating the FLO circuit to determine a corresponding second value of the observable (denoted $E(\gamma)$). For example, the computing apparatus 120 or the classical processor of the controller apparatus 130 may be used to classically simulate each FLO circuit of the plurality of FLO circuits.

Any suitable method of classically simulating an FLO circuit may be used, and the reader's attention is drawn to the known classical simulation methods described in (B. Terhal and D. DiVincenzo, Classical simulation of noninteracting-fermion quantum circuits, Phys. Rev. A, vol. 65, 032325, 2002) and in (S. Bravyi and R. Koenig. Classical simulation of dissipative fermionic linear optics, Quantum Inf. Comput., vol. 12; pp 925-943, 2012).

The efficient classical simulation approach used in this discussion is applicable to quantum routines of the following form:

1. Start with $$a_1^\dagger \ \dots \ a_\eta^\dagger |\Omega\rangle,$$

where $|\Omega\rangle$ denotes the vacuum, and $\eta$ is the occupation number.

2. Apply a sequence of operations of the form $U=\exp[-iHt]$, for some quadratic fermionic Hamiltonian H.
3. Perform one of the following types of measurements:
   a) Compute the inner product with another state of the above form;
   b) Measure the expectation of a k-body fermionic operator containing an equal number of creation and annihilation operators, where $k=O(1)$;
   c) Measure in the occupation number basis.

At 440, the method comprises establishing a training set by grouping the parameters $\gamma$ for defining each FLO circuit with the corresponding first value of the observable $\tilde{E}(\gamma)$ determined for that FLO circuit and the corresponding second value of the observable $E(\gamma)$ determined for that FLO circuit into a tuple. The training set comprises a plurality of such tuples.

The skilled person will appreciate that while step 420 has been shown as preceding step 430 in FIG. 4, this does not need to be the case and step 420 may be performed before, substantially at the same time as, of after step 430. For example, all first values of the observable may be determined (using the quantum information processor) before, contemporaneously with, or after all corresponding second values of the observable are determined. Alternatively, first and second values for the observable may be obtained for each FLO circuit in turn.

Once a training set has been established, a noise inversion function may be determined, the noise inversion function suitable for mitigating errors caused by noise in the algorithm to be executed on the quantum information processor 150.

The noise inversion function may be any suitable noise inversion function that may map an input value of an observable, for example noisy value $\tilde{E}(\theta)$, to a further value of the observable, for example corrected value $E(\theta)$, or a function thereof. For example, the noise inversion function may take as input a noisy value and output a corrected value ($\tilde{E}(\theta) \rightarrow E(\theta)$). The noise inversion function may require further input, such as a set of input parameters defining the quantum circuit of interest (e.g. $\{\theta, \tilde{E}(\theta)\} \rightarrow E(\theta)$).

Any suitable method for producing the noise inversion function using an established training set may be used.

According to a first example, determining a noise inversion function comprises performing a linear regression. One assumes that $$E(\theta) \approx b\tilde{E}(\theta) + c \qquad \text{(Equation 3)}$$

for some coefficients b and c, and determines b and c by minimising the $l_2$ error over the training set T, $$\sum_{\gamma \in T} \left( b\tilde{E}(\gamma) + c - E(\gamma) \right)^2.$$

This simple error model can be theoretically justified in the context of quantum computing by observing that the noise occurring in a quantum computer sometimes manifests itself as a simple affine transformation. In many cases (such as determining ground state energies), one can write $E(\theta) = tr(E\rho_\theta)$, where $\rho_\theta$ denotes the quantum state produced corresponding to parameters $\theta$ (if the quantum computer were perfect). Some physically reasonable noise maps $\mathcal{M}$ are of the form $\rho_\theta \rightarrow p\rho_\theta + (1-p)\sigma$ for some fixed state $\sigma$. In this case $$\tilde{E}(\theta) = tr(E\mathcal{M}(\varrho_\theta)) = ptr(E\varrho_\theta) + (1-p)tr(E\sigma) \qquad \text{(Equation 4)}$$

which is of the desired form.

According to a second example, a machine learning algorithm can be trained to learn a noise inversion map/ function.

According to this second example, a training set is received, the training set comprising a plurality of tuples. Each tuple comprises a set of one or more parameters $\gamma$ for defining a fermionic linear optics (FLO) circuit, a corresponding first value $\tilde{E}(\gamma)$ of an observable determined from one or more executions, using the quantum information processor, of that FLO circuit; and a corresponding second value $E(\gamma)$ of the observable, the second value determined from a classical simulation of that FLO circuit.

According to this second example, a machine learning algorithm is trained, using the tuples, to learn a model for mapping a first value of the observable determined from one or more executions, using the quantum information processor, of a FLO circuit to a second value of the observable determined from a classical simulation of the FLO circuit.

For example, the machine learning algorithm may comprise a neural network. For example, the machine learning algorithm may comprise a convolutional neural network. The machine learning algorithm may be trained by minimising a cost function involving the second values of the observable (the "ground truth" correct values of the observable) and the output of the final layer of the neural network. The cost function may comprise any suitable cost function such as a quadratic cost function, a cross-entropy cross function, a log-likelihood cost function. The minimisation may be performed for example by gradient descent, stochastic gradient descent or variations thereof, using backpropagation to adjust weights and biases within the neural network accordingly. Training may involve the use of further techniques known to the skilled person, such as regularization. Mini-batch sizes and numbers of epochs may be selected and fine-tuned during training. The neural network may comprise several layers of neurons (which may be, for example, perceptrons, sigmoid neurons, tanh neurons, or rectified linear units/rectified linear neurons), and may include one or more convolution layers, and may include one or more maxpool layers, and may include a soft-max layer.

According to this second example, the trained model resulting from the training is considered to be a noise inversion function.

A trained model may accordingly be understood to include all information determined in training. For example, the trained model may include the complete collection of weights and biases for neurons of a neural network established during training and details of hyperparameters such as the learning rate and mini-batch size.

Figure 6:
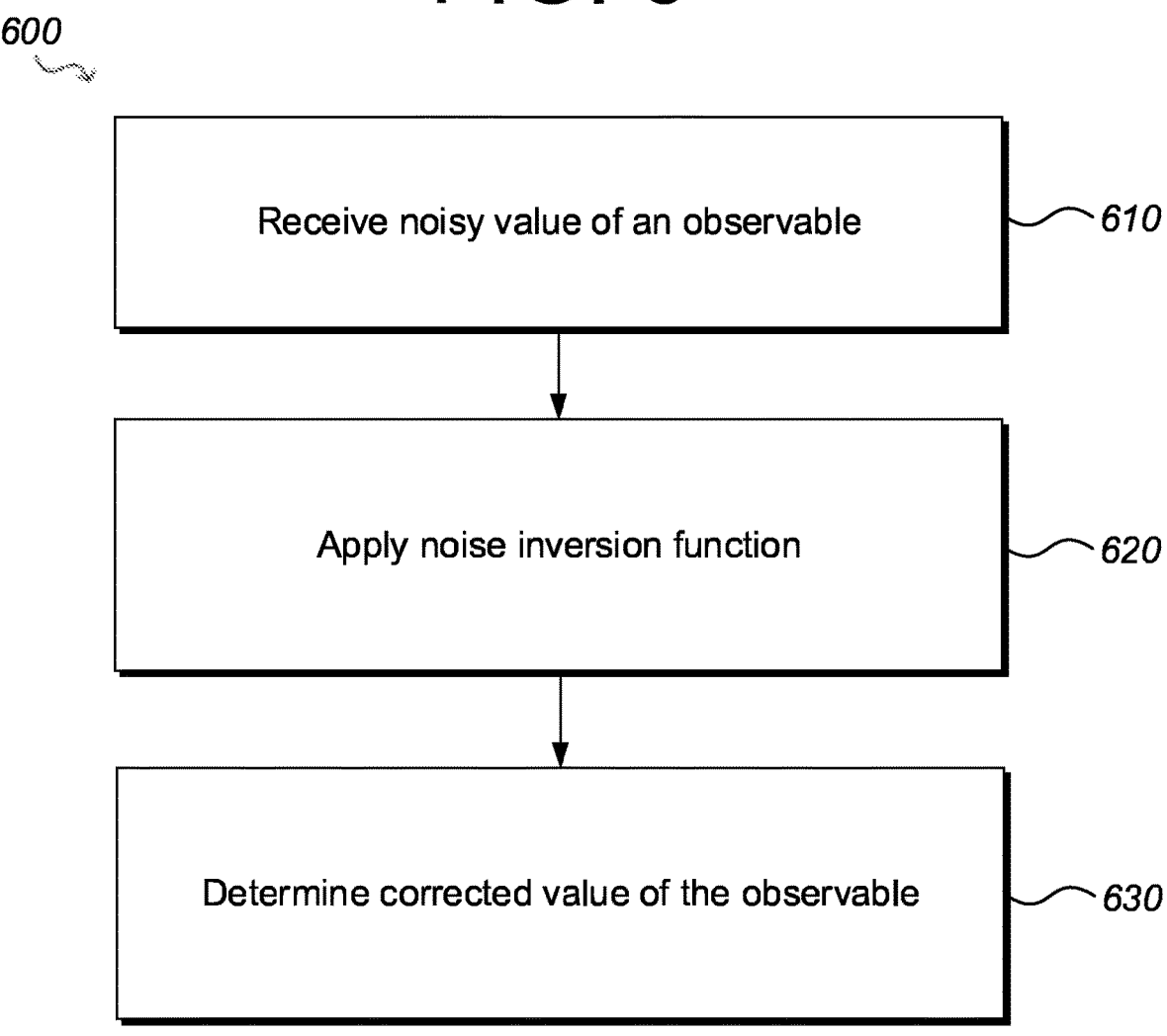
FIG. 6 shows a flowchart of a method for mitigating noise in an algorithm implemented using a quantum information processor.
Figure 7A:
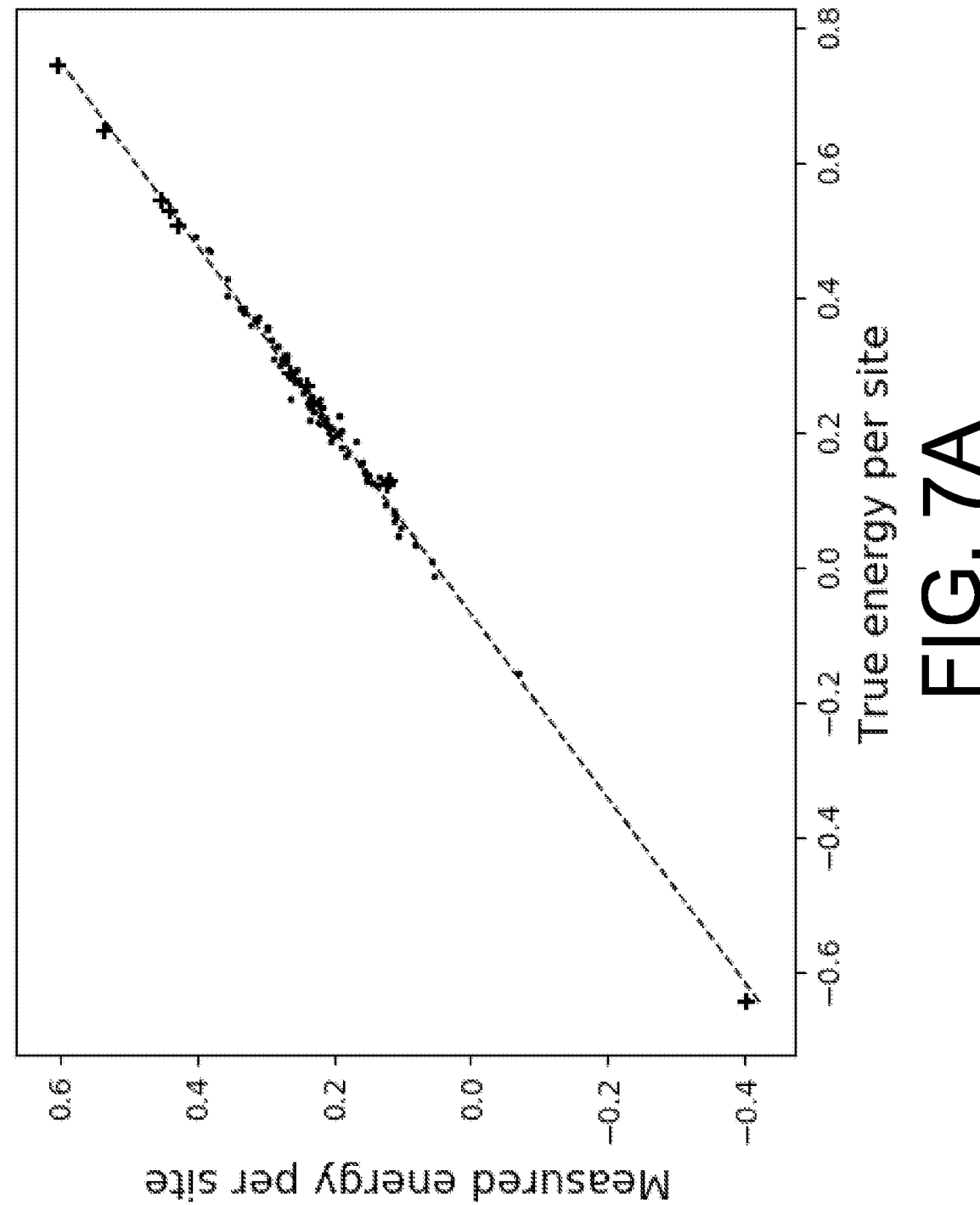
FIG. 7A shows a plot of noisy energies against true energies for a 2×3 Hubbard model instance with a qubit depolarising noise rate of 0.01.
Figure 7B:
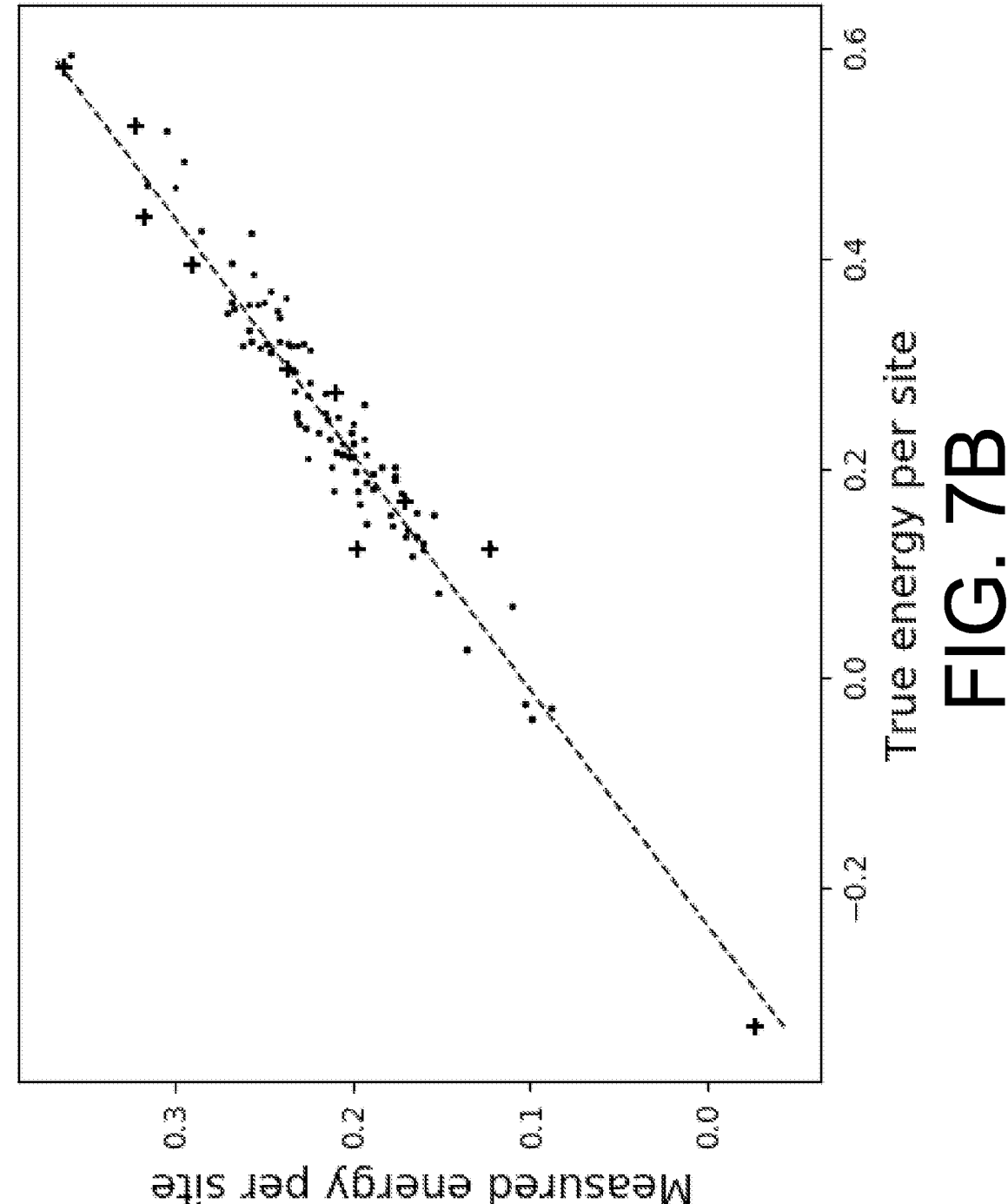
FIG. 7B shows a plot of noisy energies against true energies for a 2×3 Hubbard model instance with a qubit depolarising noise rate of 0.02.
Figure 7C:
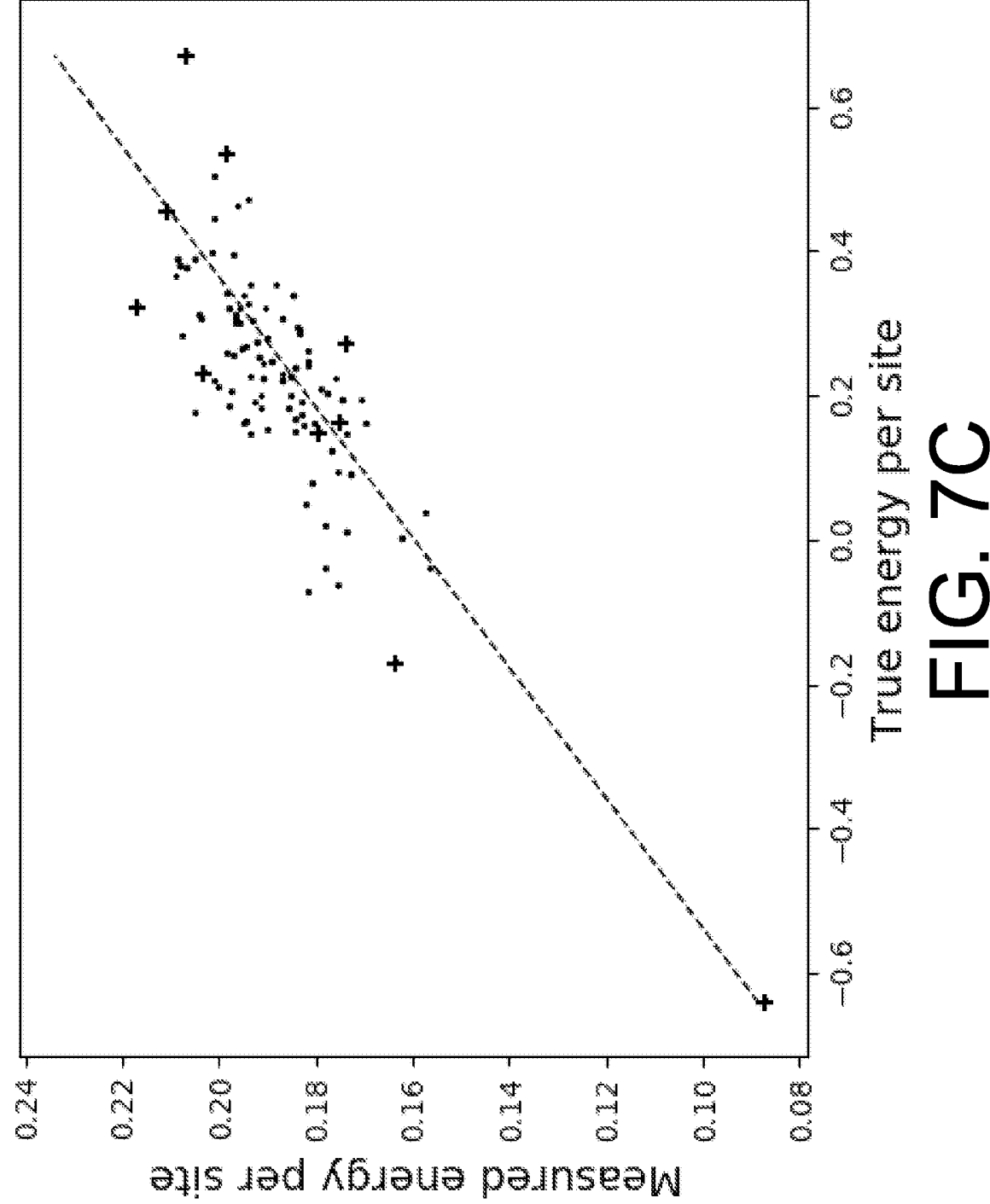
FIG. 7C shows a plot of noisy energies against true energies for a 2×3 Hubbard model instance with a qubit depolarising noise rate of 0.05.
Figure 7D:
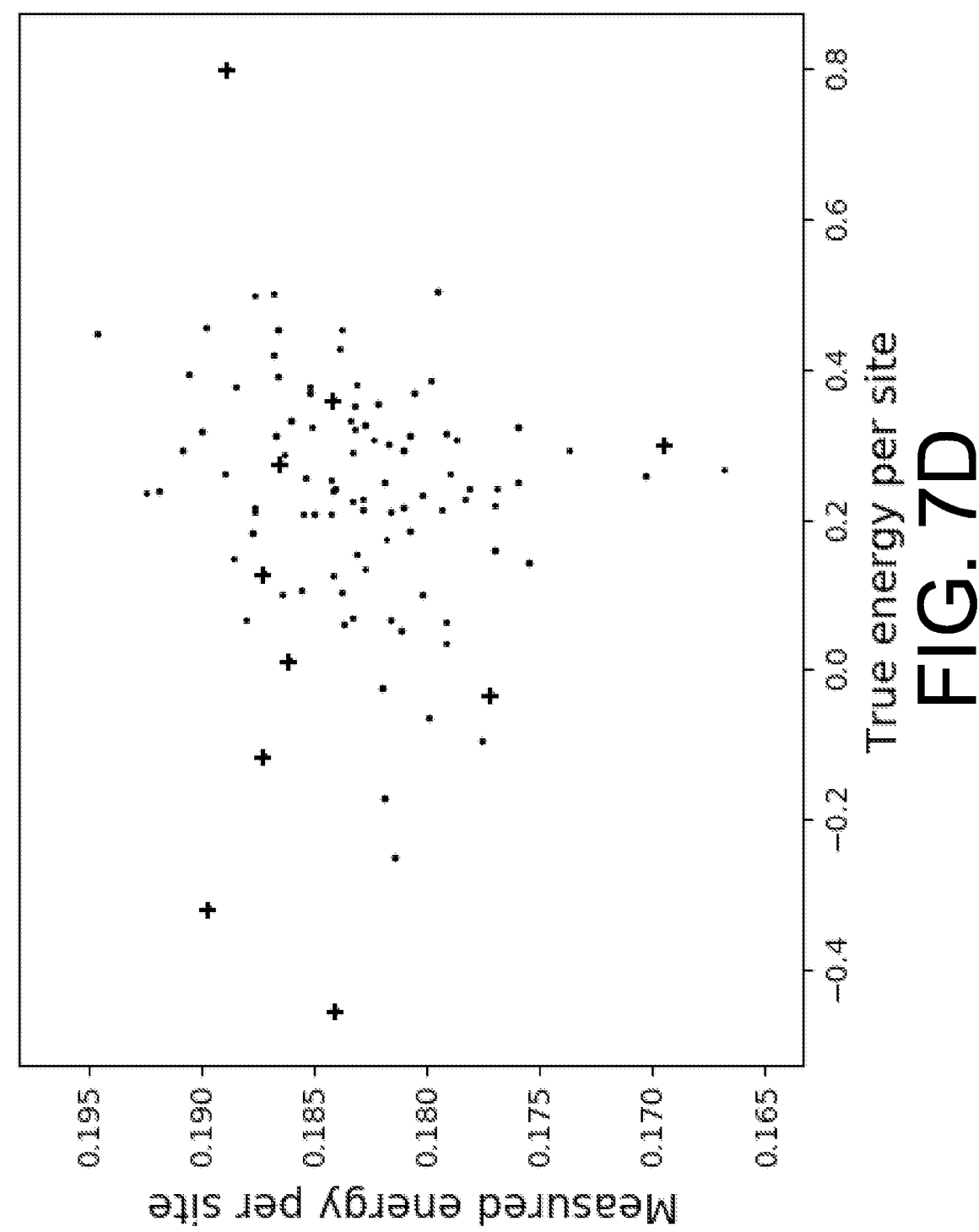
FIG. 7D shows a plot of noisy energies against true energies for a 2×3 Hubbard model instance with a qubit depolarising noise rate of 0.1.

Turning now to FIG. 6, a method is described for mitigating errors caused by noise in an algorithm executed using a quantum information processor. The method may be performed by a classical processor. For example, the method may be performed by controller apparatus 130 or computing apparatus 120 of FIG. 1.

At 610, the method comprises receiving a noisy value $\tilde{E}(\zeta)$ of an observable, the noisy value of an observable determined from one or more executions, using the quantum information processor, of a quantum circuit $C(\zeta)$, defined by a set of one or more parameters $\zeta$, for implementing at least a part of the algorithm.

At 620, the method comprises applying a noise inversion function to the noisy value. The noise inversion function is determined using a training set such as that described further above in relation to FIG. 4. The noise inversion function may be determined using any suitable method, for example linear regression.

At 630, the method comprises determining, from the output of the noise inversion function, a corrected value $E(\zeta)$ of the observable.

A compelling feature of TFLO is that error-mitigation can be carried out post hoc, and without changing the quantum circuit $C(\zeta)$ executed; if the error-mitigating transformation is accurate, one can apply it to results obtained in an experiment after that experiment is complete.

This may not always be the most appropriate way of applying this error-mitigation technique when a hybrid quantum-classical algorithm like VQE is used, because the behaviour of the algorithm depends on measurements made at each step. However, linear regression has an interesting feature when combined with gradient-based outer optimisation algorithms in VQE, such as simultaneous perturbation stochastic optimisation (SPSA) or gradient descent. Each noisy energy measurement is converted to an estimated true energy via an affine map $\tilde{E}(\theta) \rightarrow b\tilde{E}(\theta) + c$. The gradient of $\tilde{E}(\theta)$ is unaffected by this map, except by an overall scaling by b. This implies that gradient-based optimisation algorithms may be almost or completely unaffected by this transformation, so post-hoc application of this technique may be essentially equivalent to applying it at each step of the algorithm.

To obtain accurate results, it is important that the FLO circuits executed in training are representative of the "test" circuit with parameters $\theta$ for which one intends to compute $E(\theta)$, in the sense that the level of noise in the training circuits is similar to the test circuit. If training circuits are obtained by setting some parameters to zero (the ones that correspond to non-FLO operations), this could result in gates in the circuit being removed (replaced with the identity gate), which could reduce the level of noise. However, this can be avoided by adding dummy gates into the circuit or turning off circuit compiler optimisations.

Although FLO circuits are relatively general, and can produce highly entangled states, restricting to this class of circuits when training could in principle produce outputs which are somewhat unrepresentative of the generic outputs produced in a quantum simulation circuit. For example, in the case of the Hamiltonian variational ansatz applied to the Fermi-Hubbard model as described above, producing FLO circuits by setting all the onsite angles to zero will produce quantum states which are not entangled across the spin up/spin down partition. However, the state actually generated by the quantum circuit may be entangled, as errors may lead to zero parameters effectively being replaced with small non-zero parameters.

An example of the TFLO process will now be described. The inventors tested the TFLO method via classical simulations. In particular, the inventors considered the problem of determining the ground state energy of a (2×3) (12-qubit) instance of the Hubbard model.

The ground state is within the subspace with occupation number 4. The inventors used the VQE algorithm to optimise over quantum circuits picked from the Hamiltonian variational ansatz, as described in detail in (C. Cade et al. Phys. Rev. B, vol. 102, 235122, 2020). Ansatz instances with 3 layers were considered, which is sufficient to represent a quantum state which achieves a fidelity higher than 99% with the ground state. The system sizes considered were small enough that the quantum circuits could be simulated exactly classically using generic methods, without needing to implement the FLO simulation algorithm of (B. Terhal and D. DiVincenzo, Phys. Rev. A, vol. 65, 032325, 2002).

First, the inventors determined the relationship between true energies and measured (noisy) energies, with varying noise rates. This provides evidence for the ability of a linear fit to give a good estimate of the energy, and also determines whether this relationship for parameters corresponding to FLO circuits is representative of generic parameters. The inventors used a depolarising noise model: after every 2-qubit gate in the quantum circuit, depolarising noise is applied on each qubit acted on by that gate. Noise rates in the set {0.01, 0.02, 0.05, 0.1} were tested. For each noise rate, energies were evaluated for 100 random choices of quantum circuit parameters, with 10,000 measurements taken for each. For 90 of these points, the quantum circuit parameters were all uniformly random in the range [0,2π]. For the remaining 10 points (highlighted), circuit parameters were uniformly random, except that the parameters corresponding to onsite terms were set to 0; these correspond to FLO circuits. The noisy energies incorporated error mitigation by postselecting on the occupation number: for each measurement that returned an incorrect occupation number, the result was discarded and the circuit was executed again.

FIGS. 7A-7D show the plots of the noisy (measured) energies against the exact (true) energies per site for a (2×3) Hubbard model instance and different levels of qubit depolarising noise. In particular, for FIG. 7A the depolarising noise is 0.01, for FIG. 7B the depolarising noise is 0.02, for FIG. 7C the depolarising noise is 0.05, and for FIG. 7D the depolarising noise is 0.1. Plots already take into account the effect of error detection by postselecting on the correct occupation number. Crosses represent randomly chosen parameters with onsite parameters set to 0. The black dashed line in each plot shows a linear fit based on these parameters alone. Mean errors before and after, for the plots of FIGS. 7A-7D, are respectively: 0.034→0.011, 0.066→0.026, 0.109→0.078, and 0.139→0.183.

One can see from FIGS. 7A-7D that there is an excellent linear fit for low noise rates, but very little correlation for noise rate 0.1. Correspondingly, the mean error is not reduced in this regime. The inventors attribute this to the noise rate being so high that measured energies are concentrated within a narrow range, implying that more measurements would be needed to distinguish between different energies.

The inventors next tested the VQE algorithm itself. As the outer classical optimiser, a simplified version of the SPSA algorithm tested in (Cade et al., Phys. Rev. B, vol. 102, 235122, 2020) was used, where 1000 iterations were taken, each with 1000 measurements. The effect of using the linear regression strategy described above was tested, and compared with the previously known error-detection strategy of postselecting on a given occupation number (Cade et al., Phys. Rev. B, vol. 102, 235122, 2020). The results over the first 50 iterations are shown in FIG. 8; there was little change in energies over the remaining iterations.

Figure 8:
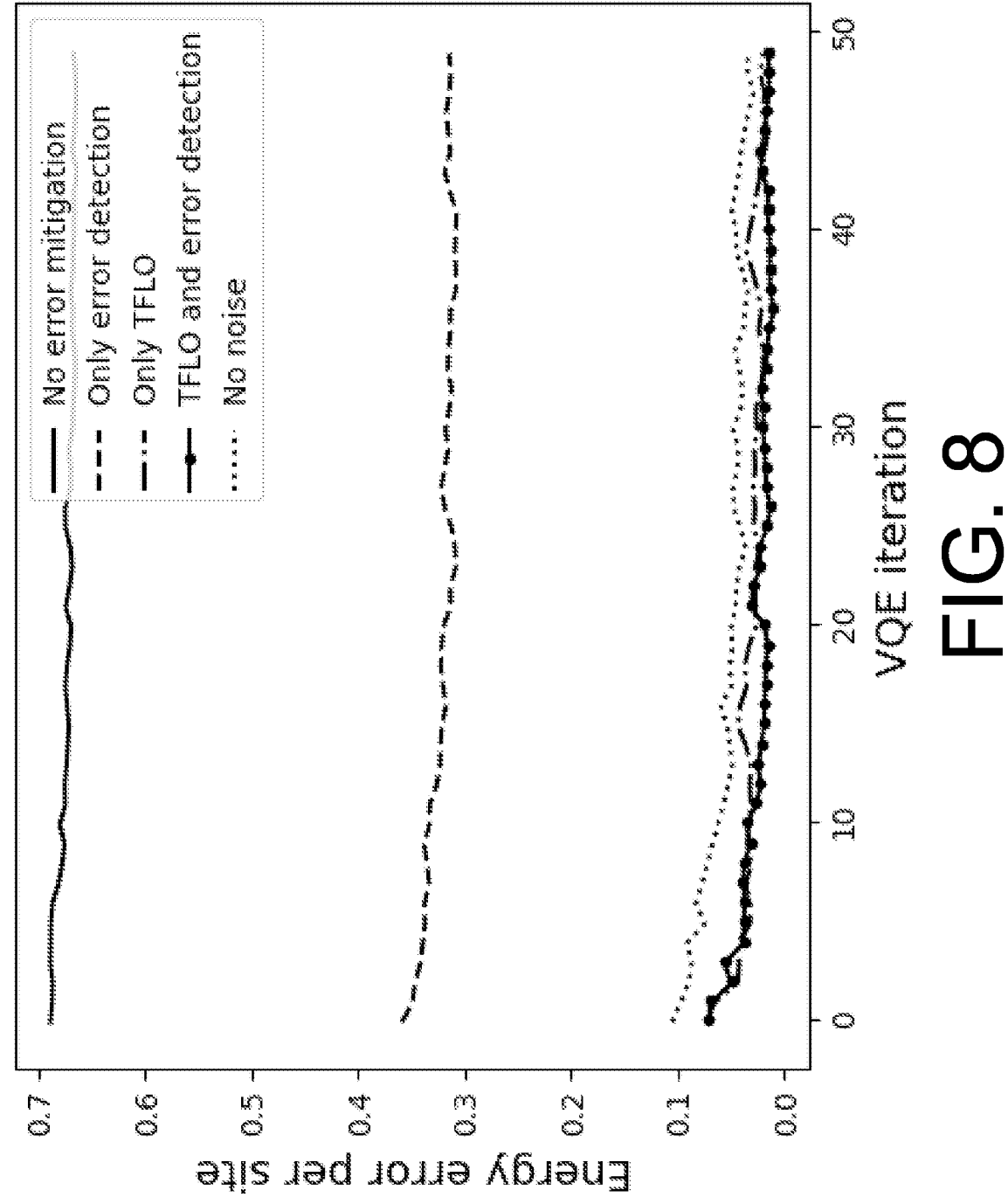
FIG. 8 shows a plot illustrating errors in energy per site throughout the VQE algorithm with depolarising noise with rate 0.01.

In FIG. 8, errors in energy per site throughout the VQE algorithm with depolarising noise with rate 0.01 are plotted. The noiseless case is included for comparison purposes. For each error-mitigation method, the inventors ran 5 times and show the median result obtained. All plotted values are a rolling mean over a window of size 5.

It is clear visually that using TFLO to mitigate errors is significantly more effective than error-detection by postselection on occupation number. The final median error in energy per site if no error-mitigation techniques are used was 0.659, which is high enough to make the estimated energy essentially meaningless. Using error detection by postselection reduced this error to 0.299, whereas also using TFLO reduced the error to 0.0191, which is an improvement by a factor of more than 34 compared with the original error, and is comparable to the level of error that one would expect from statistical fluctuations alone, if there were no noise at all. Indeed, notably, the median error after mitigation was also below the final median error in the noiseless case (0.0248).

Many variations of the methods described herein will be apparent to the skilled person.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method for mitigating errors caused by noise in an algorithm executed using a quantum information processor, wherein the algorithm is configured to simulate a fermionic system and comprises a target quantum circuit for implementing at least a part of the algorithm, and wherein the method comprises:

identifying a plurality of fermionic linear optics (FLO) circuits, wherein each FLO circuit of the plurality of FLO circuits approximates the target quantum circuit, wherein each of plurality of FLO circuits comprise a quantum circuit for which all gates are of the form exp [iHq], where Hq is a quadratic fermionic Hamiltonian;

for each FLO circuit of the plurality of FLO circuits:

executing, one or more times using the quantum information processor, that FLO circuit to determine a first value of an observable; and classically simulating that FLO circuit to determine a second value of the observable; establishing a training set comprising a plurality of tuples, each tuple comprising:

a set of one or more parameters for defining a FLO circuit of the plurality of FLO circuits;

the corresponding first value of the observable determined for that FLO circuit; and the corresponding second value of the observable determined for that FLO circuit;

determining, using the training set, a noise inversion function;

executing, one or more times using the quantum information processor, a quantum circuit for implementing at least a part of the algorithm to determine a noisy value of an observable;

applying the noise inversion function to the noisy value; and determining, from an output of the noise inversion function, a corrected value of the observable.

2. The method according to claim 1, wherein the method further comprises determining the plurality of FLO circuits which approximate the quantum circuit.

3. The method according to claim 2, wherein determining the plurality of FLO circuits which approximate the quantum circuit comprises analysing the quantum circuit and determining a plurality of FLO circuits experiencing noise which approximates noise experienced by the quantum circuit.

4. The method according to claim 1, wherein the quantum circuit includes one or more FLO gates, and wherein FLO circuits of the plurality of FLO circuits preserve a location and/or parameters of one or more of those FLO gates.

5. The method according to claim 1, wherein FLO circuits of the plurality of FLO circuits consist of matchgates acting on consecutive qubits of the quantum information processor.

6. The method according to claim 1, wherein applying the noise inversion function to the noisy value comprises providing the noisy value and one or more parameters defining the quantum circuit as input to the noise inversion function.

7. The method according to claim 1, wherein determining the noise inversion function comprises performing a linear regression.

8. The method according to claim 1, wherein determining the noise inversion function comprises training a machine learning algorithm to learn a model for mapping the first value of the observable determined from one or more executions, using the quantum information processor, of the FLO circuit to the second value of the observable determined from a classical simulation of the FLO circuit.

9. The method according to claim 1, wherein the observable comprises an energy of a quantum state with respect to a given quantum Hamiltonian.

10. The method according to claim 1, wherein the algorithm comprises a variational quantum eigensolver (VQE) algorithm.

11. A computer readable medium having instructions stored thereon which, when read by a processor of a computing apparatus, cause the computing apparatus to perform the method according to claim 1.

12. A computing apparatus comprising:
one or more memory units; and
one or more classical processors configured to execute instructions stored in the one or more memory units to perform the method according to claim 1.

13. The computing apparatus according to claim 12, further comprising the quantum information processor configured to execute the quantum circuit for implementing the algorithm.

14. The computing apparatus according to claim 13, wherein the quantum information processor is further configured to execute a fermionic linear optics (FLO) circuit to determine a value of an observable.

15. The computing apparatus according to claim 14, further comprising interaction means for interacting with the quantum information processor.

* * * * *